United States Patent
Zhao et al.

(10) Patent No.: US 9,747,518 B2
(45) Date of Patent: Aug. 29, 2017

(54) AUTOMATIC CALIBRATION SAMPLE SELECTION FOR DIE-TO-DATABASE PHOTOMASK INSPECTION

(71) Applicant: KLA-Tencor Corporation, Milpitas, CA (US)

(72) Inventors: Feng Zhao, San Jose, CA (US); Gang Pan, Fremont, CA (US)

(73) Assignee: KLA-Tencor Corporation, Milpitas, CA (US)

(*) Notice: Subject to any disclaimer, the term of this patent is extended or adjusted under 35 U.S.C. 154(b) by 126 days.

(21) Appl. No.: 14/703,546

(22) Filed: May 4, 2015

(65) Prior Publication Data
US 2015/0324664 A1    Nov. 12, 2015

Related U.S. Application Data

(60) Provisional application No. 61/988,908, filed on May 6, 2014.

(51) Int. Cl.
| | |
|---|---|
| *G06K 9/00* | (2006.01) |
| *G06K 9/46* | (2006.01) |
| *G06K 9/62* | (2006.01) |
| *G06K 9/52* | (2006.01) |
| *G06T 1/20* | (2006.01) |
| *G06T 7/00* | (2017.01) |

(52) U.S. Cl.
CPC .......... *G06K 9/52* (2013.01); *G06K 9/6221* (2013.01); *G06T 1/20* (2013.01); *G06T 7/001* (2013.01); *G06K 2009/4666* (2013.01); *G06T 2207/30148* (2013.01)

(58) Field of Classification Search
USPC ........................................ 382/144, 192, 225
See application file for complete search history.

(56) References Cited

U.S. PATENT DOCUMENTS

| | | | |
|---|---|---|---|
| 7,978,902 B2 | 7/2011 | Usui et al. | |
| 8,234,601 B2 | 7/2012 | Abdo et al. | |
| 8,615,126 B2* | 12/2013 | Park .......................... | G03F 1/70 382/144 |
| 2003/0076989 A1 | 4/2003 | Maayah et al. | |
| 2007/0112699 A1 | 5/2007 | Zhao et al. | |
| 2007/0233419 A1 | 10/2007 | Pack et al. | |
| (Continued) | | | |

OTHER PUBLICATIONS

Sumikawa et al, "A Pattern Mining Framewaork for Inter-Wafer Abnormality Analysis", 2013 IEEE, pp. 1-10.*

(Continued)

*Primary Examiner* — Kathleen Y Dulaney
(74) *Attorney, Agent, or Firm* — Simpson & Simpson, PLLC

(57) ABSTRACT

A method for selecting samples of reticle design data patterns in order to calibrate the parameters based on which the reference image used in a die-to-database reticle inspection method is rendered, the method comprising the steps of applying local binary pattern (LBP) analysis to a plurality of samples to obtain a p-dimensional vector output for each of the plurality of samples, clustering the q-D data points to M groups, selecting one sample from each clustered group, calculating evaluation scores for the samples selected, and, selecting a portion of the M samples on the representativeness score and the diversity score.

20 Claims, 5 Drawing Sheets

(56) References Cited

U.S. PATENT DOCUMENTS

2011/0299758 A1    12/2011  Shi et al.
2013/0236083 A1     9/2013  Wang et al.

OTHER PUBLICATIONS

Hector Garcia William Volk, Sterling Watson, Carl Hess; Chris Aquino, Jim Wiley, Chris Mack, New Die to Database Inspection Algorithm for Inspection of 90-nm Node Reticles, Photomask and Next-Generation Lithography Mask Technology X, Hiroyoshi Tanabe, Editor, Proceedings of SPIE vol. 5130 (2003) © 2003 SPIE• 0277-786X/03/ $15.00, KLA-Tencor, San Jose, CA 95134.

* cited by examiner

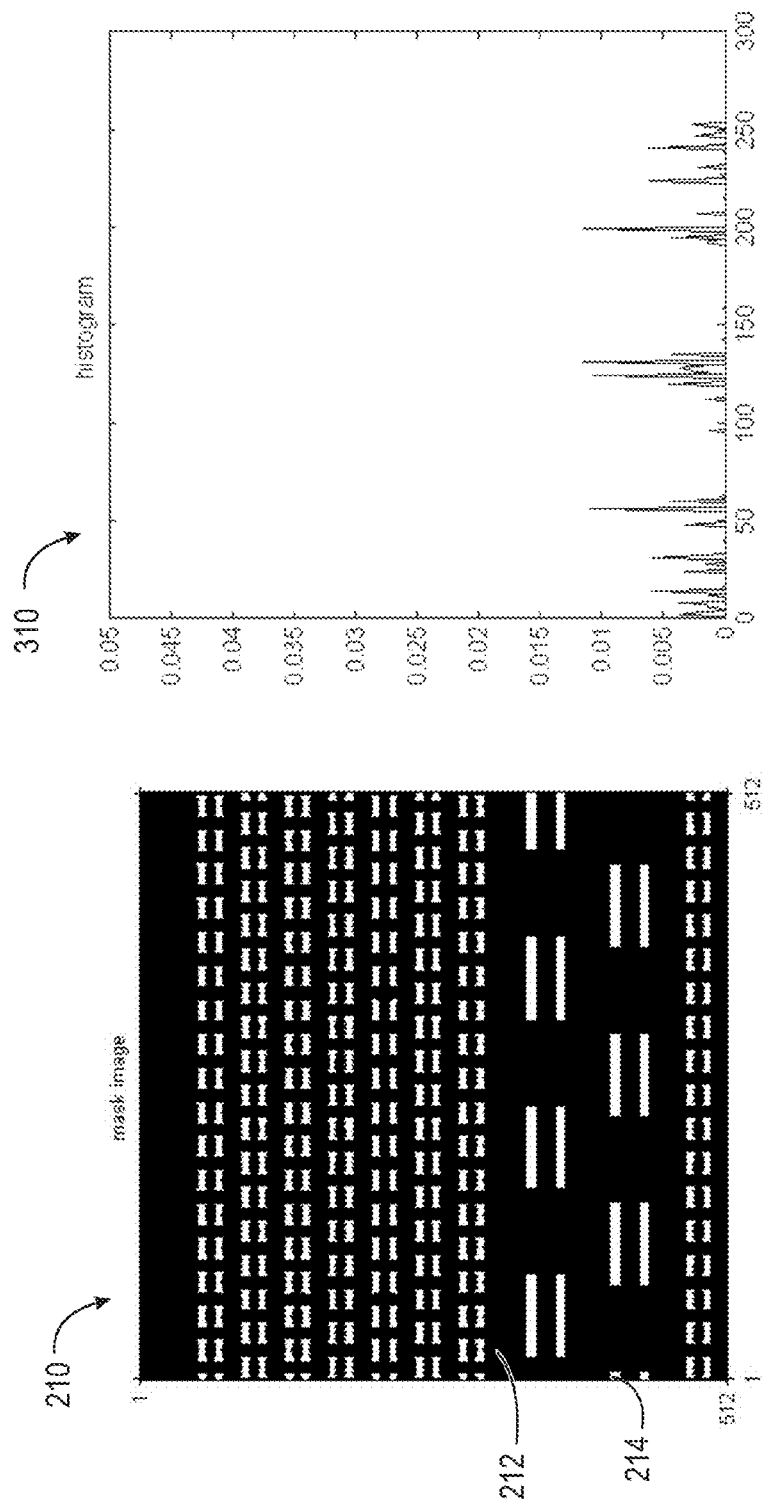

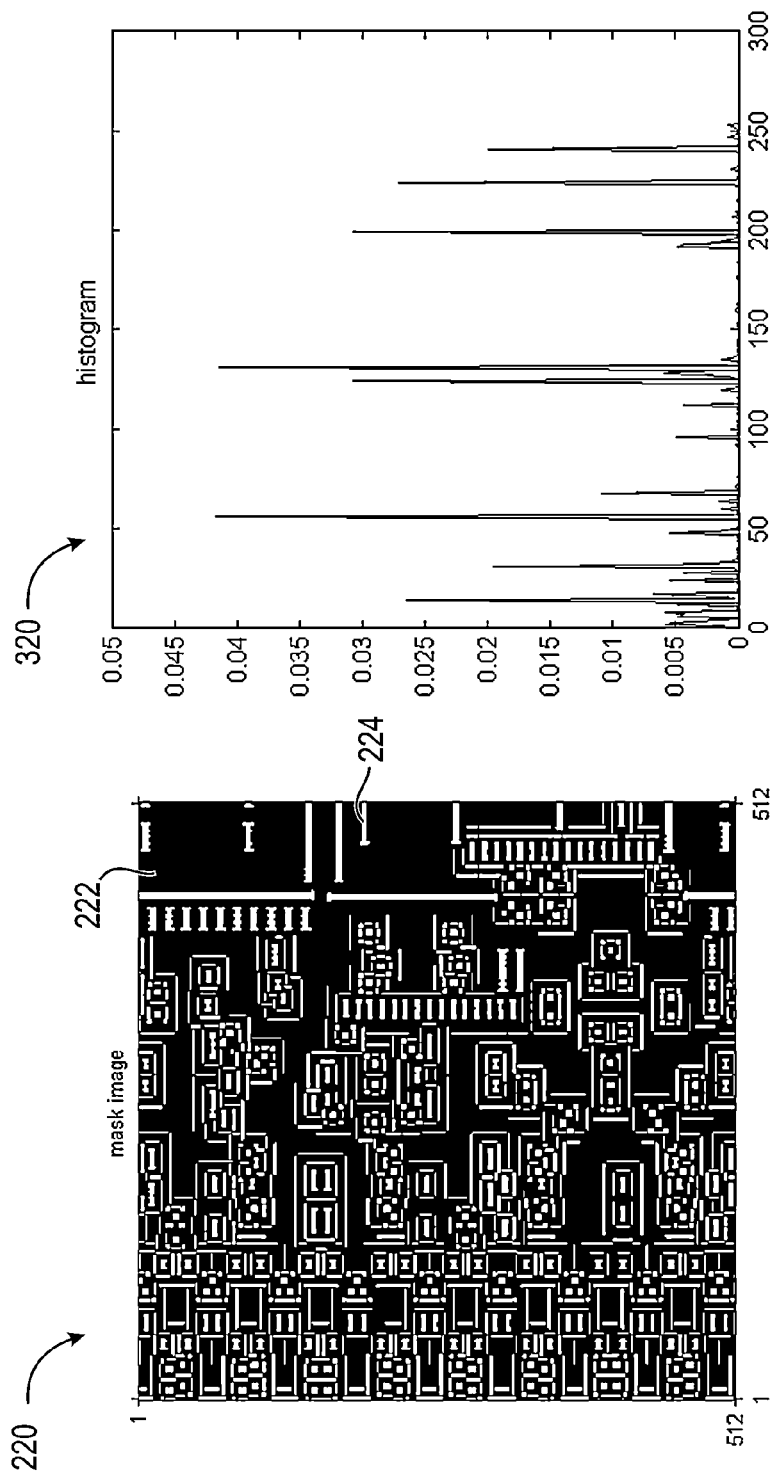

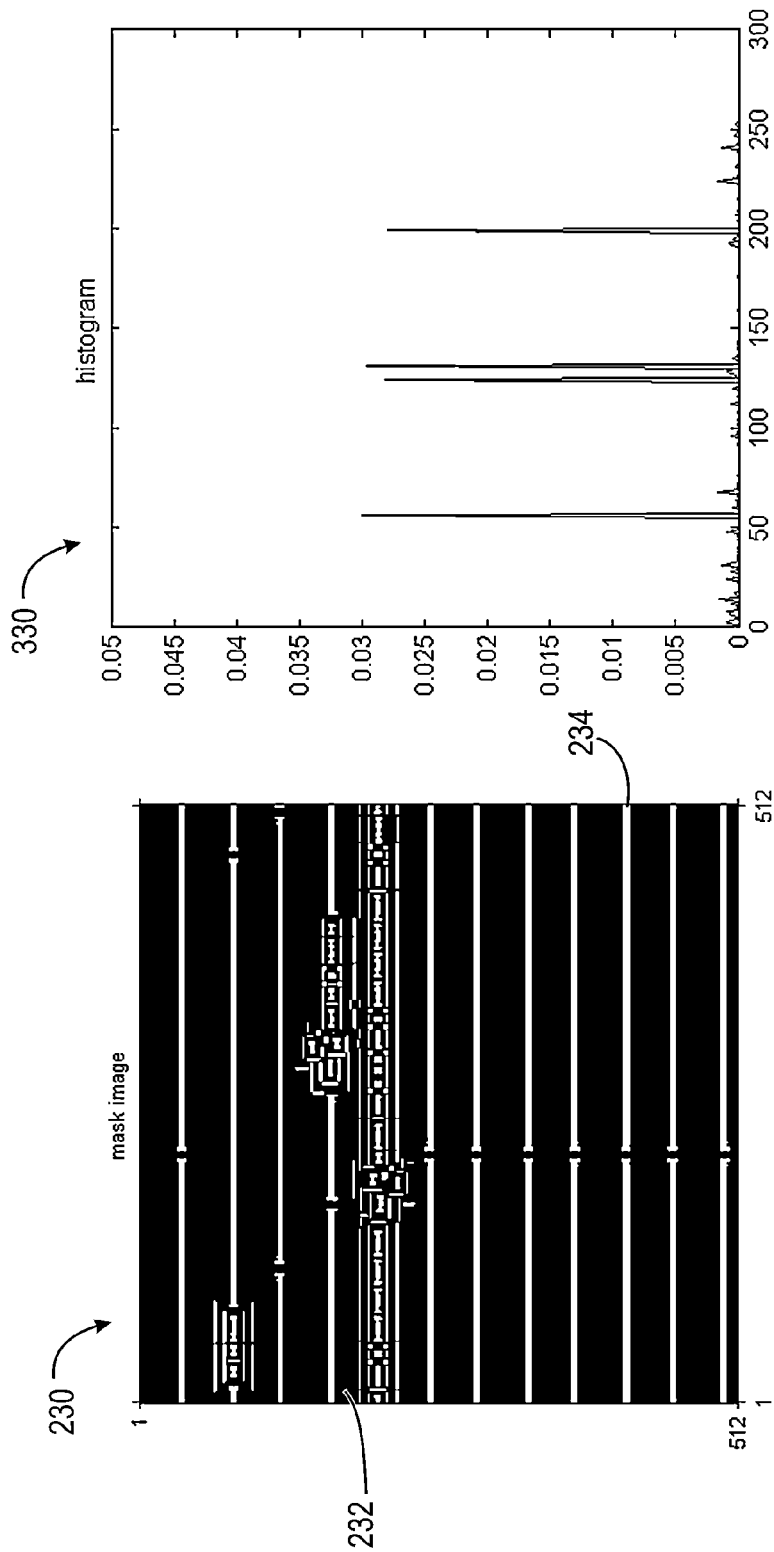

AUTOMATIC CALIBRATION SAMPLE SELECTION FOR DIE-TO-DATABASE PHOTOMASK INSPECTION

CROSS-REFERENCE TO RELATED APPLICATIONS

This application claims the benefit of U.S. Provisional Patent Application No. 61/988,908, filed on May 6, 2014, which application is incorporated herein by reference in its entirety.

TECHNICAL FIELD

The present invention relates generally to photomask inspection, and, more specifically, to die-to-database photomask inspection and, even more specifically, to automatic calibration sample selection for die-to-database photomask inspection.

BACKGROUND

A photomask, in general, is used in the intermediate step between the design of an integrated circuit and the actual wafer itself. The photomask acts as a stencil to print an image on the semiconductor material. In the past, the convention was a 1:1 transfer of the image from the mask to the wafer. The 1:1 transfer has given way to a "step and repeat" system utilizing reduction lens systems that expose a mask image stepped many times across the wafer plane. The step and repeat systems result in larger image field sizes on the photomask. Since the magnification is no longer 1:1, the photomask may be referred to as a reticle.

Typically, a computer-aided design (CAD) system is used that enables a designer to completely describe the circuit pattern of an integrated circuit electronically. This electronic design data generates a set of instructions for a pattern generator to use and print the desired mask features onto the photomask. Generally, the mask is then subjected to a variety of processes, which includes etching the pattern into the photomask, and the photomask then becomes ready for quality assurance inspections.

The quality assurance inspections can include, for example, measuring critical dimensions to ensure that the mask features are printed at the proper size. Also, since semiconductor devices are built layer by layer, the image fields of the photomasks used for each layer can be inspected to ensure that the layers "stack" upon each other within some tolerance. In short, defect inspections are performed to ensure that there are no reticle defects larger than a given size. If defects are found, they must be repaired or determined to be within the specification required for printing.

Die-to-die and die-to-database are two pattern defect reticle inspection methods that are known and used in the industry. In die-to-die inspection methods, the patterns in neighboring units are compared in order to detect any discrepancies. Thus, comparing one die against another on the same reticle requires both dice to have the same design. The inspection system scans the areas to be inspected, collects images and processes them in order to identify differences between dice. Differences that exceed a preset threshold level are detected as defects. Since two or more dice with an identical design are needed for die-to-die inspection to work, single die reticles are not capable of being inspected with this method.

In die-to-database inspection methods, the inspection system compares images collected from the reticle to rendered images that are stored in a database. In order for this method to be successful, the rendered images must resemble the processed features on the reticle as closely as possible. Thus, the stored images are rendered from the design data used to write the reticle that is being inspected.

By its own nature, die-to-database inspection is a more complicated process, requiring advanced algorithms for both data rendering, image processing and defect detection. It also requires more processing power. However, one of the great advantages of die-to-database is the ability to inspect single die reticles, and, in general, 100% of any reticle layout. Single die reticles are used for many purposes including reticles for development and debugging of new lithography processes and techniques, multi-product shuttle reticles, and server chip MPU reticles, among others.

Die-to-database photomask inspection requires a calibration step to calibrate the parameters based on which the reference image is rendered. Due to high nonlinearity of the image rendering model, selection of effective calibration samples is crucial for a successful inspection. First-time success rate of die-to-database photomask inspection is also critical. As repeating the inspection procedure may take several hours, first-time failure can severely affect throughputs of customers' products.

One of the main causes for failure in die-to-database inspection is sub-optimal calibration results. Achieving optimal calibration results is often highly dependent on calibration sample selections, which is typically done manually by an operator who must have significant practical experience and/or a deep understanding of the image rendering model in order to make the selection competently. Generally, due to the enormous data, visual inspection of every sample is impractical, and hence the operator typically selects the calibration samples by: a) randomly picking a small set of samples, e.g., tens of samples, from the whole plate of a photomask; and, b) selecting an even smaller set of samples, usually less than 15, from the samples picked in step a) based on various factors. The various factors include representativeness of the samples of the whole plate, uniqueness of the sample patterns, difficulty of image rendering of the sample patterns, and other subjective operator experience.

Despite the knowledge of the operator, calibration samples are usually selected in a subjective and empirical way because there is no scientific evaluation of the process. This can unpredictably cause calibration failure leading to inspection failure. Further, the selection is likely to be incomplete. The operator randomly picks tens of samples from millions of candidates, making it likely for the operator to miss important samples that have large impacts on the calibration. For inexperienced operators or unfamiliar types of photomasks, selecting calibration samples can be time-consuming and challenging.

Therefore, there is a long-felt need for an improved method for selecting effective calibration samples from the photomask design data that increases the first-time success rate. There is also a long-felt need for an automated selection method that replaces part of the manual work to decrease the amount of practical experience required to make a selection. Further, there is a long-felt need for a selection method that selects effective calibration samples in a stable manner.

SUMMARY OF THE INVENTION

The present invention comprises a method for selecting samples of reticle design data patterns in order to calibrate the parameters based on which the reference image used in a die-to-database reticle inspection method is rendered, the method comprising the steps of applying local binary pattern (LBP) analysis to a plurality of design data samples to obtain a p-dimensional vector output for each of the plurality of samples, clustering the set of vector output data points into M number of groups, selecting one sample from each clustered group, calculating evaluation scores for the samples selected, and, selecting a portion of the M samples on the representativeness score and the diversity score.

The present invention also comprises a computer-based apparatus having a memory element configured to store a plurality of computer-readable instructions, and, a processor configured to execute the plurality of computer-readable instructions to apply local binary pattern (LBP) analysis to a plurality of samples to obtain a p-dimensional vector output for each of the plurality of samples, cluster the q-D data points to M groups, select one sample from each clustered group, calculate evaluation scores for the samples selected, and, select a portion of the M samples on the representativeness score and the diversity score.

The present invention constructs a process to automatically select effective calibration samples using a series of techniques from computer vision and image processing fields. The process includes LBP analysis, a feature description method that efficiently describes pattern features of each sample in an abstract and concise way. Based on the LBP analysis results and further optional analyses, the method either directly finishes the calibration sample selection and enters the calibration without any interruption, or provides a small set of calibration sample candidates along with the corresponding evaluation scores for each sample, which is followed by a manual selection.

The present invention automates the selection process procedure and minimizes requirements on the operator's knowledge, significantly improving completeness and effectiveness of calibration sample selection. This enables standardized evaluation scores to replace subjective and unstable manual work, which improves robustness of the products. The method of the present invention is unlikely to increase inspection time, and, as a result, the inspection first-time success rate can be significantly improved.

These and other objects, advantages and features of the present invention will be better appreciated by those having ordinary skill in the art in view of the following detailed description of the invention in view of the drawings.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 2B is an exemplary photomask pattern;

FIG. 2C is an exemplary photomask pattern;

FIG. 2D is an exemplary photomask pattern;

FIG. 3B is a histogram according to a local binary pattern analysis of the photomask pattern in FIG. 2B;

FIG. 3C is a histogram according to a local binary pattern analysis of the photomask pattern in FIG. 2C; and, FIG. 3D is a histogram according to a local binary pattern analysis of the photomask pattern in FIG. 2D.

DETAILED DESCRIPTION OF THE INVENTION

Figure 1:
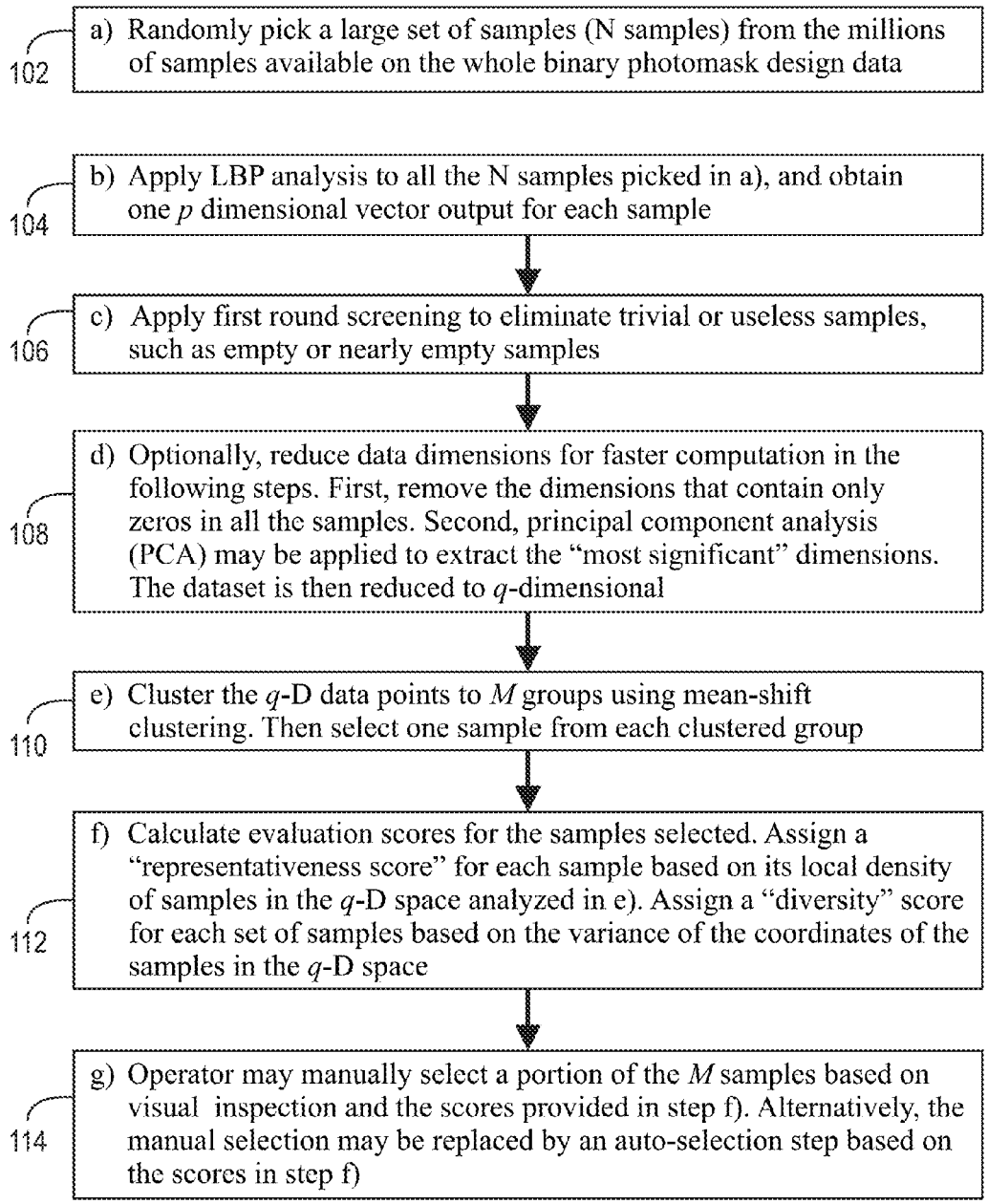
FIG. 1 is a high level schematic flowchart of a die-to-database metrology method, according to an example embodiment of the present invention.

At the outset, it should be appreciated that like reference characters on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In the below description, an embodiment is an example or implementation of the invention. The various appearances of "one embodiment", "an embodiment", "certain embodiments" or "some embodiments" do not necessarily all refer to the same embodiments.

FIG. 1 is a high level schematic flowchart of die-to-database method 100, according to some embodiments of the invention.

Method 100 comprises step 102, which includes randomly picking a large set of N samples from the millions of samples available on a typical whole binary photomask design data. (Obviously there could be fewer than "millions of samples" available.) Step 102 can be executed during the inspection setup, or during the offline database preparation stage. Step 102 is optional if the selection happens during the offline database preparation stage because the entire database can be processed by method 100. If the selection happens during the inspection setup, step 102 may be mandatory and the number of random samples N can be up to hundreds of thousands. During offline database preparation, all the N samples available on the whole plate of the binary photomask design data are inputted to the auto-selection process.

Figures 2A, 3A:
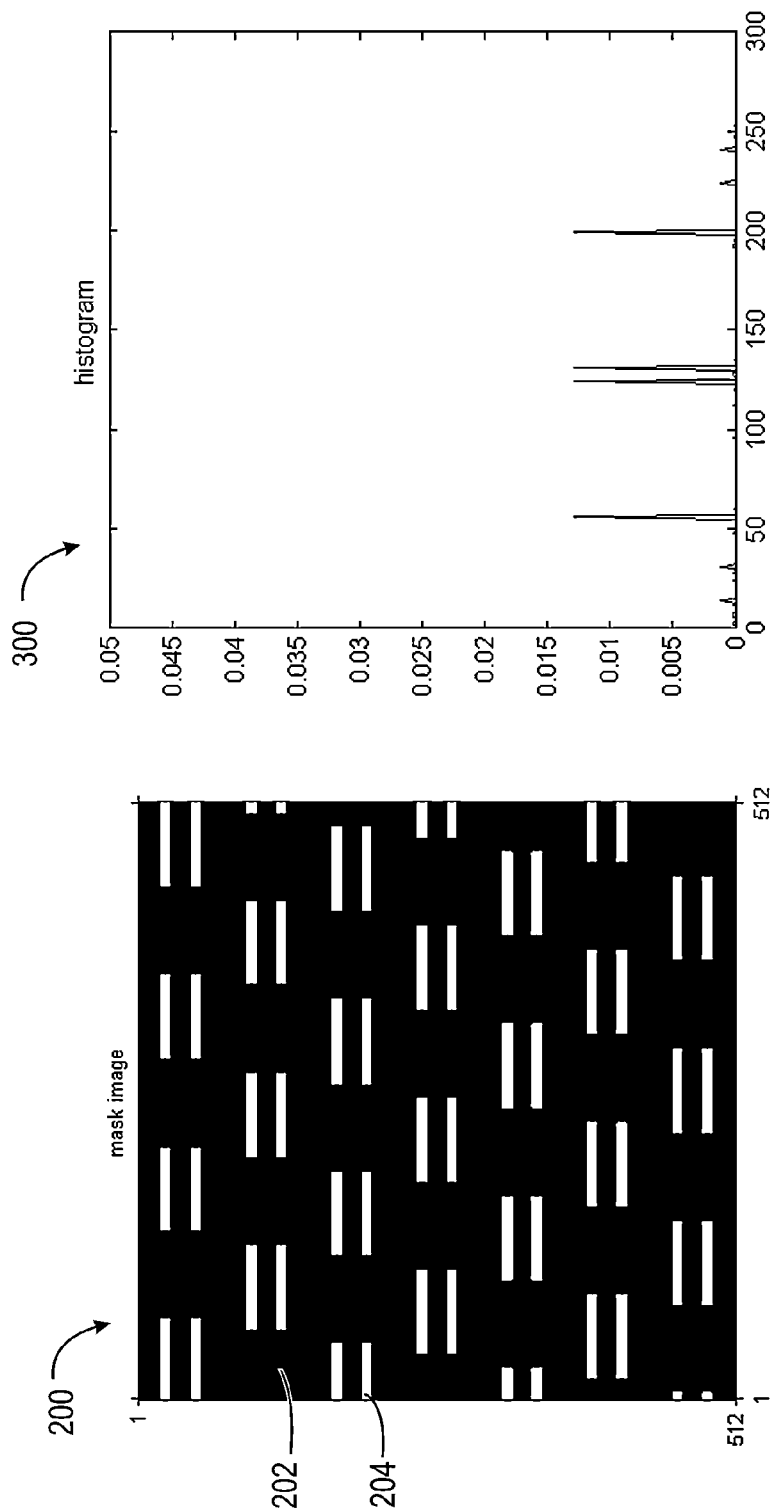
FIG. 2A is an exemplary photomask pattern.
FIG. 3A is a histogram according to a local binary pattern analysis of the photomask pattern in FIG. 2A.

FIGS. 2A-2D illustrate exemplary photomasks picked as the N samples in step 102. FIG. 2A shows photomask 200 having dark regions 202 and light regions 204, FIG. 2B shows photomask 210 having dark regions 212 and light regions 214, FIG. 2C shows photomask 220 having dark regions 222 and light regions 224, FIG. 2D shows photomask 230 having dark regions 232 and light regions 234, Step 104 of method 100 is applying LBP analysis to all the N samples picked in step 102 and obtaining one p-dimensional vector output for each sample. LBP is used for texture-pattern recognition, and it concisely represents the pattern features of an image with distributions of local pixel value variations. The LBP operator labels the pixels of an image by thresholding the neighborhood of each pixel and considers the result as a binary number. The histogram of these $2^8=256$ different labels can then be used as a texture descriptor.

The LBP operator has the notation: $LBP_{P,R}^{u2}$. The subscript represents using the operator in a (P, R) neighborhood. Superscript u2 stands for using only uniform patterns and labeling all remaining patterns with a single label. After the LBP labeled image $f_l(x,y)$ has been obtained, the LBP histogram can be defined as:

$$H_i = \sum_{x,y} I\{f_l(x, y) = i\}, i = 0, \ldots, n-1$$

where N is the number of different labels produced by the LBP operator, and $I\{A\}$ is 1 if A is true and 0 if A is false. If the image patches whose histograms are to be compared have different sizes, the histograms must be normalized to get a coherent description:

$$N_i = \frac{H_i}{\sum_{j=0}^{n-1} H_j}.$$

In an example embodiment, the LBP operator is used in an (8, 1) neighborhood. In an example embodiment, the LBP operator is used in a (16, 2) neighborhood. Which neighborhood to use is determined by balancing the tradeoff between computation and performance. With some built-in dimension reduction in the LBP analysis, the dimension of the output vectors (i.e., p) in step 104, is approximately 60 or 250 for the (8, 1) and (16, 2) neighborhoods, respectively.

FIGS. 3A-3D are histograms of their corresponding photomasks in FIGS. 2A-2D respectively. Specifically, FIG. 3A shows LBP histogram 300 for photomask 200 shown in FIG. 2A, FIG. 3B shows LBP histogram 310 for photomask 210 shown in FIG. 2B, FIG. 3C shows histogram 320 for photomask 220 shown in FIG. 2C, and, FIG. 3D shows histogram 330 for photomask 230 in FIG. 2D.

In an exemplary embodiment, the LBP operator is applied to the N samples in parallel in a supercomputer, producing N p-dimensional vectors (p can be approximately 60).

Method 100 also includes step 106, which is to apply a first round screening to eliminate trivial or useless samples. Screening out empty samples, nearly empty samples, and/or samples with large flat regions, leaves a total of N' samples with vectors left.

Step 106 screens out trivial samples by eliminating the samples with LBP values, i.e., the normalized histogram, close to $[x_f, 0, \ldots, 0, x_p]$, where $x_f+x_p=1$. Those LBP values precisely indicate that their corresponding sample images nearly only have flat dark or flat bright regions. Such samples are less of interest in the calibration and need to be eliminated.

Optionally, data dimensions can be reduced by implementing step 108 for faster computation in the steps that follow. Step 108 includes removing the dimensions that contain only zeros in all the samples, and optionally applying principal component analysis (PCA) to extract the most significant dimensions. In short, step 108 reduces the dataset to q-dimensional vectors. Applying PCA can significantly reduce computation, but can sometimes affect overall performance. Thus, if computation is not a severe issue, PCA is not needed.

PCA is a technique used to emphasize variation and bring out strong patterns in a dataset. It is an orthogonal linear transformation that transforms the data to a new coordinate system such that the greatest variance by some projection of the data comes to lie on the first coordinate (called the first principal component), the second greatest variance on the second coordinate, and so on. Each principal component is calculated by taking a linear combination of an eigenvector of the correlation matrix with the variables.

To summarize step 108: the unused dimensions of the N' p-D, i.e., p-dimensional, vectors are dropped, leaving N' q-D, i.e., q-dimensional, vectors. Where q includes the most significant dimensions.

Step 110 is to cluster the q-D data into a number of M of groups using mean-shift clustering. Then select one data point around each of the M cluster centers. One advantage of mean-shift clustering the q-D vectors is that there is only one parameter, i.e., the radius of the clusters in the q-D space, and then the number M of groups is automatically determined. The clustering radius be adjusted iteratively to make M within a certain reasonable range. In an example embodiment, M is approximately 40 to 50.

Step 112 is to calculate the representativeness scores for the M number of samples resulting from step 110. In an example embodiment, the samples with the top 5 representativeness scores are selected first. Next, calculate the distances of the rest M-5 samples to the center of the M samples in the q-D space. Then select the 15 samples with the longest distances from the center, and generate all the combinations for a 10 sample set. Adding the 5 most representative samples to all the 10-sample sets, diversity scores are then calculated for all the sets. Finally, the set with the highest diversity score is selected. These 15 samples are used in the calibration.

Method 100 can either directly finish the calibration sample selection and output the calibration, or it can output a small set of calibration sample candidates along with the corresponding evaluation scores for each sample, which is followed by a manual selection.

The invention is not limited to those diagrams or to the corresponding descriptions. For example, flow need not move through each illustrated box or state, or in exactly the same order as illustrated and described.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

What is claimed is:

1. A method for selecting samples of reticle design data patterns the method comprising the steps of:
   applying local binary pattern (LBP) analysis to a plurality of design data samples to obtain a p-dimensional vector output for each of the plurality of samples;
   clustering the plurality of samples based on respective p-dimensional vector outputs of the plurality of samples into M number of groups;
   selecting one sample from each clustered group;
   calculating an evaluation score for the for each of the samples selected; and,
   selecting a portion of the M number of groups based on a representativeness score and a diversity score;

wherein the portion of the M number of groups is selected in order to calibrate at least one parameter used to render a reference image used in a die-to-database reticle inspection method.

2. The method of claim 1, further comprising the step of randomly selecting the plurality of samples.

3. The method of claim 1, further comprising the steps of:
removing the p-dimensional vector outputs that have a value of zero in all the samples of the plurality of design data samples; and,
applying principal component analysis (PCA) to extract at least one significant p-dimensional vector output in order to reduce data dimensions for faster computation;
wherein q-dimensional vector outputs result from the removing and applying steps, and the vector output data points that are clustered into M number of groups are the q-dimensional vector outputs.

4. The method of claim 1, wherein the local binary pattern analysis is conducted with a 1 pixel radius neighborhood for a total number of 8 pixels.

5. The method of claim 1, wherein the local binary pattern analysis is conducted with a 2 pixel radius neighborhood for a total number of 16 pixels.

6. The method of claim 1, further comprising:
eliminating trivial samples by applying first round screening.

7. The method of claim 1, wherein the local binary pattern analysis is applied to the plurality of design data samples of a whole plate of photomasks.

8. The method of claim 1, wherein the local binary pattern analysis is applied to the plurality of design data samples of a set of samples randomly selected by a computer algorithm.

9. The method of claim 1, wherein the step of clustering the plurality of samples based on the respective p-dimensional vector outputs of the plurality of design data samples into M number of groups uses mean-shift clustering.

10. The method of claim 1, wherein the evaluation score is the representativeness score for each sample of the plurality of design data samples based on a local density of the plurality of design data samples in a q-D space analyzed in the clustering step.

11. The method of claim 1, wherein the evaluation score is the diversity score for each set of samples based on a variance of a set of coordinates of samples in the plurality of design data samples in a q-D space.

12. A computer-based apparatus, comprising:
a memory element configured to store a plurality of computer-readable instructions and a database of design data; and,
a processor configured to execute the plurality of computer-readable instructions to:
select samples of reticle design data patterns in the database in order to calibrate at least one parameter based on which a reference image used in a die-to-database reticle inspection method is rendered, by:
applying local binary pattern (LBP) analysis to a plurality of calibration samples to obtain a p-dimensional vector output for each of the plurality of samples;
clustering the the plurality of calibration samples based on respective p-dimensional vector outputs of the plurality of calibration samples into M number of groups;
selecting one sample from each clustered group;
calculating an evaluation score for each of the samples selected; and,
selecting a portion of the samples of the M number of groups based on a representativeness score and a diversity score.

13. The computer-based apparatus of claim 12, wherein the processor is configured to execute the plurality of computer-readable instructions to:
remove the p-dimensional vector outputs that have a value of zero in all the samples of the plurality of calibration samples; and,
apply principal component analysis (PCA) to extract at least one significant p-dimensional vector in order to reduce data dimensions for faster computation.

14. The computer-based apparatus of claim 12, wherein the processor is configured to execute the plurality of computer-readable instructions to:
conduct the local binary pattern analysis with a 1 pixel radius neighborhood for a total number of 8 pixels.

15. The computer-based apparatus of claim 12, wherein the processor is configured to execute the plurality of computer-readable instructions to:
conduct the local binary pattern analysis with a 2 pixel radius neighborhood for a total number of 16 pixels.

16. The computer-based apparatus of claim 12, wherein the processor is configured to execute the plurality of computer-readable instructions to:
apply the local binary pattern analysis to the plurality of calibration samples of a whole plate of photomasks.

17. The computer-based apparatus of claim 12, wherein the processor is configured to execute the plurality of computer-readable instructions to:
apply the local binary pattern analysis to the plurality of calibration samples of a set of samples randomly selected.

18. The computer-based apparatus of claim 12, wherein the processor is configured to execute the plurality of computer-readable instructions to:
data cluster using mean-shift clustering.

19. The computer-based apparatus of claim 12, wherein the processor is configured to execute the plurality of computer-readable instructions to:
provide the evaluation score as the representativeness score for each sample from each clustered group of p-dimensional vector outputs based on a local density of samples in a q-dimensional space analyzed in the clustering step.

20. The computer-based apparatus of claim 12, wherein the processor is configured to execute the plurality of computer-readable instructions to: provide the evaluation score as the diversity score for each sample in the plurality of calibration samples based on a variance of a set of coordinates of samples of the plurality of calibration samples in a q-dimensional space.

* * * * *